United States Patent
Kogler

(10) Patent No.: US 8,999,160 B1
(45) Date of Patent: Apr. 7, 2015

(54) FILTER PLATE SHIFTER

(71) Applicant: Daniel Simpson, Rio Vista, CA (US)

(72) Inventor: Ferdinand Kogler, Rio Vista, CA (US)

(73) Assignee: Daniel J. Simpson, Rio Vista, CA (US)

( * ) Notice: Subject to any disclaimer, the term of this patent is extended or adjusted under 35 U.S.C. 154(b) by 193 days.

(21) Appl. No.: 13/633,099

(22) Filed: Oct. 1, 2012

Related U.S. Application Data

(60) Provisional application No. 61/542,011, filed on Sep. 30, 2011.

(51) Int. Cl.
*B01D 25/172* (2006.01)
*B01D 25/21* (2006.01)
*B01D 25/12* (2006.01)

(52) U.S. Cl.
CPC ............ *B01D 25/215* (2013.01); *B01D 25/172* (2013.01); *B01D 25/125* (2013.01)

(58) Field of Classification Search
CPC .... B01D 25/12; B01D 25/124; B01D 25/125; B01D 25/14; B01D 25/172; B01D 25/19; B01D 25/21; B01D 25/215; B01D 25/164; B01D 25/32; B01D 25/34; B01D 25/343; B01D 2201/26; B30B 9/045
USPC ......... 210/224–231, 236, 237, 297, 298, 324, 210/350; 100/198, 199, 208, 209
See application file for complete search history.

(56) References Cited

U.S. PATENT DOCUMENTS

| | | | | |
|---|---|---|---|---|
| 1,390,531 A * | 9/1921 | Lockwood | .................... | 210/227 |
| 3,306,455 A * | 2/1967 | Fismer | ................. | 210/230 |
| 3,712,460 A * | 1/1973 | Kitajima | ................. | 198/746 |
| 3,754,657 A * | 8/1973 | Harp | ..................... | 210/230 |
| 3,951,808 A * | 4/1976 | Harp | ..................... | 210/230 |
| 4,359,385 A * | 11/1982 | Krivec | ................ | 210/230 |
| 5,672,272 A | 9/1997 | Baer | | |
| 6,149,806 A | 11/2000 | Baer | | |
| 8,535,542 B2 | 9/2013 | Simpson et al. | | |
| 8,580,084 B2 | 11/2013 | Simpson et al. | | |
| 2001/0021428 A1 | 9/2001 | Simpson et al. | | |
| 2008/0230461 A1* | 9/2008 | Schulte et al. | ................ | 210/231 |
| 2011/0203999 A1 | 8/2011 | Simpson et al. | | |

FOREIGN PATENT DOCUMENTS

GB    2042916 A   * 10/1980

* cited by examiner

*Primary Examiner* — David C Mellon
(74) *Attorney, Agent, or Firm* — David H. Jaffer; Pillsbury Winthrop Shaw Pittman LLP

(57) ABSTRACT

A mechanical plate shifter system for moving filter plates in a filter press during a process of plate separation for filter cake removal comprises: a pusher to automatically engage with a single filter plate at the end of a stack or at the edge of a gap in the stack for moving the plate forward and then automatically disengaging when the plate reaches an end plate/dummy plate or another filter plate previously pushed. The filter plates are configured with handles for engaging with the pusher. The pusher is attached to a continuous drive belt and is configured with a pivoting structure including: a head with a receiving notch for a handle of a filter plate; and a counterweight for the head. The pusher and belt are configured relative to the filter plate stack to allow for filter plates to be engaged/disengaged by the receiving notch.

15 Claims, 6 Drawing Sheets

FILTER PLATE SHIFTER

CROSS-REFERENCE TO RELATED APPLICATIONS

This application claims the benefit of U.S. Provisional Application No. 61/542,011 filed Sep. 30, 2011, incorporated herein by reference in its entirety.

FIELD OF THE INVENTION

The invention relates to a filter plate shifter mechanism and method for moving filter plates in a filter press.

BACKGROUND OF THE INVENTION

Filter presses are used for dewatering, drying, separation, extraction, chemical processing etc. of a wide range of materials. The material to be processed is held in chambers formed between adjacent filter plates. When processing is complete, the chambers are emptied of any remaining material—for example filter cake remains after a drying process and is removed for further processing. This emptying process requires the filter plates to be physically separated so as to open up the chambers and allow the remaining material to be removed/fall out. Plate shifters are used to separate the plates in the filter plate stack and to restack the filter plates after the chambers are emptied. The emptying process is time consuming and is in need of improvements to reduce the time required to empty the chambers and to restack the filter plates.

SUMMARY OF THE INVENTION

The invention is a mechanical plate shifter system which moves filter plates during a process of plate separation for filter cake removal. The press is opened, providing a gap between the stack of filter plates and an end plate/dummy plate. The shifter system is configured with a pusher to automatically engage the last filter plate in the stack of plates in the press before the gap and separates this plate from the rest of the plates in the stack. The pusher is configured to move the plate forward and automatically disengages when the plate reaches the end plate/dummy plate or stack of filter plates previously pushed. Multiple mechanical pushers are attached to a continuous drive belt so as to efficiently move the large number of plates in the filter plate stack. Drive belts/conveyer chain may be installed on both sides of a press with pushers synchronized to push on the same plate at the same time. The pusher is configured with a pivoting structure including a head with a receiving notch for a filter plate and a counterweight. The pivoting structure is held by a pivot stand which attaches to a belt/conveyor. The pusher is configured relative to the filter plate stack to allow for filter plates to be engaged/disengaged by the receiving notch in order to move the filter plates as described above.

According to aspects of the invention, a filter press with a mechanical plate shifter mechanism may comprise: a filter press frame, the frame including a first frame rail and a second frame rail, the first frame rail being configured parallel to the second frame rail; a first stack of filter plates hanging on the first and second parallel frame rails, each of the filter plates in the first stack having a first handle adjacent to the first frame rail and a second handle adjacent to the second frame rail; a first plate pusher attached to a first drive belt, the first drive belt being attached to the filter press frame, the first drive belt being configured to move the first plate pusher parallel to the first frame rail in a first direction; a second plate pusher attached to a second drive belt, the second drive belt being attached to the filter press frame, the second drive belt being configured to move the second plate pusher parallel to the second frame rail in the first direction; wherein the first and second plate pushers are configured to simultaneously automatically mechanically engage with the first and second handles of only the last filter plate in the first stack as the first and second plate pushers move in the first direction, the last filter plate being the last filter plate encountered by the first and second plate pushers as the first and second plate pushers move in the first direction along the length of the first stack and wherein the first and second plate pushers are configured to simultaneously automatically mechanically disengage from the first and second handles of the last filter plate on reaching one of a second stack of filter plates or an endplate while moving in the first direction. The first plate pusher and the second plate pusher may each comprise: a head with a receiving notch configured to engage with the handle of the filter plates; a counter weight rigidly attached to the head, the counter weight being configured to keep the head raised in the absence of any handles coming into contact with the head; and a pivot stand rigidly attached to the drive belt and attached to the head by a pivot joint, wherein the head is configured to rotate relative to the pivot stand in a vertical plane. Furthermore, the first plate pusher and the second plate pusher may each further comprise a stabilizer rigidly attached to the pivot stand, the stabilizer being configured to act as a stop for the counter weight. The head may be configured with a profile including a tapered leading edge, followed on the upper side of the head by a rise and then the notch, and wherein the rise is scaled with respect to the notch and the handle to disengage the handle from the notch when the rise is pushed below the bottom level of a handle.

According to further aspects of the invention, a method of moving plates utilizing the mechanical plate shifter system of the present invention is described herein.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

As is well known in the art, filter presses include a stack of filter plates, the filter plates are covered by filter cloths, and each pair of filter plates defines a chamber lined with filter cloths into which slurry or other material is fed for dewatering or similar processing. Generally, there will be a stack of N filter plates in a filter press, and M chambers between the plates, where M=N-1 and M and N are integers. Details of filter presses and filter plates which are representative of those manufactured and installed worldwide by I DES, Inc. and affiliated companies are provided in US Patent Application Publications Nos. 2010/0116755, 2011/0186417 and 2011/0203999, incorporated by reference in their entirety herein.

Figure 1A:
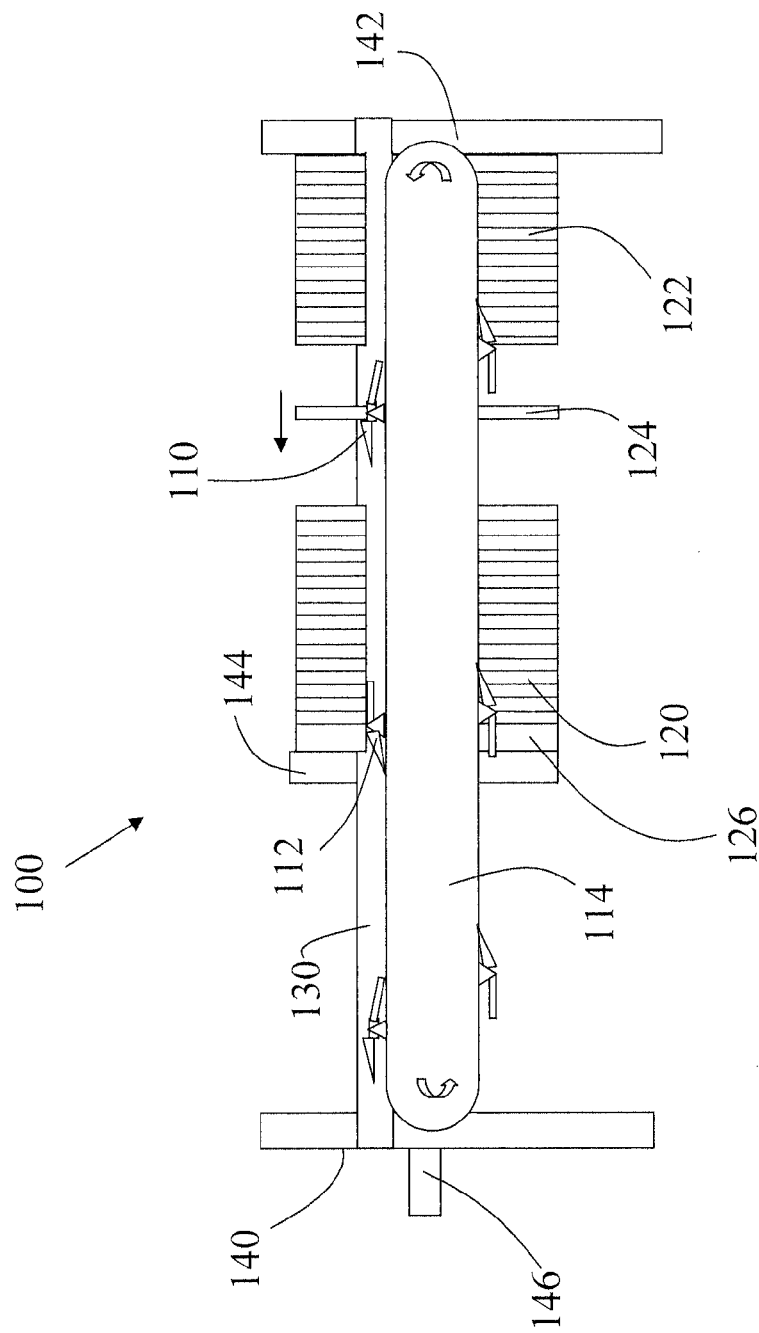
FIGS. 1A and 1B are side and top view representations of a filter press system with a plate shifter, according to some embodiments of the present invention.
Figure 1B:
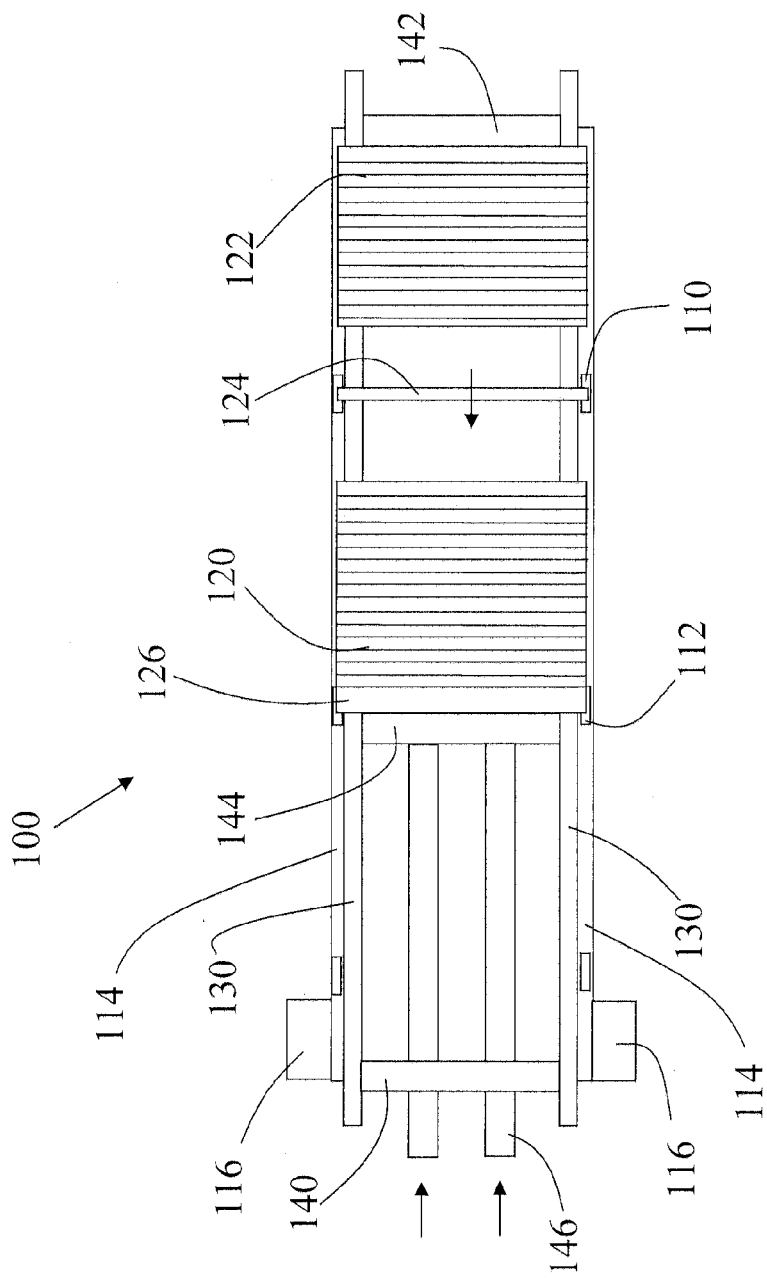

FIGS. 1A & 1B show side and top views of a filter press 100, according to some embodiments of the present invention. The filter press 100 includes stacks of filter plates 120, 122 mounted in a press comprising frame rails 130, on which the filter plates hang, fixed end plates 140 and 142, a movable plate 144, and rods 146 for applying a compressive force to the movable plate 144 as shown. Application of a compressive force to the movable plate 144 results in consolidating the stacks of plates 120 and 122 into a single stack and compressing the stack of filter plates. Multiple filter plate pushers, such as pushers 110 and 112, are shown attached to a drive belt 114. The drive belt 114 is powered by a motor 116. Drive belts 114 are installed on both sides of a filter press with pushers synchronized to push on the same plate at the same time. For example, in FIG. 1B plate 124 is shown being moved with pushers on both sides—the plate 124 has been separated from stack 122 allowing filter cake to drop out (see FIG. 5) and is being moved toward stack 120, into which it will be incorporated.

The mechanical plate shifter system of the present invention may be used as follows. The filter press is opened, providing a gap between the stack of filter plates and an end plate. The shifter system is configured with a pusher to automatically engage the last filter plate in the stack of plates in the press before the gap and separates this plate from the rest of the plates in the stack. The pusher is configured to move the plate forward and automatically disengages when the plate reaches the end plate/dummy plate or stack of filter plates. For example, with reference to FIG. 1A, the pusher 110 has picked up plate 124 and moved the plate from stack 122 toward stack 120. The head of the pusher is kept down by the filter plates when moving underneath the stack of plates—see pusher 112 under stack 120; however, when the pusher reaches a gap the head rises and engages a filter plate—see pusher 110 which has engaged plate 124. When the pusher carrying a plate reaches another stack, such as stack 120, the head is pushed down by the plates in the stack and the carried plate is released—for example, when plate 124 reaches stack 120 the head of pusher 110 is pushed down and the plate is released, becoming part of stack 120. Note that a dummy plate 126 is bolted to the end plate 144. The dummy plate 126 is thicker than a regular filter plate and does not engage in the receiving notch of the pusher—this ensures that when the head of the pusher rises on moving past stack 120 it does not get caught by engaging the last plate in the stack.

Multiple pushers may be used on the drive belt to speed up the process of plate shifting. Ideally at least one plate, if not more, is being moved at any time—the number of pushers on the drive belt can be chosen to ensure this criterion is satisfied. Furthermore, the plate shifting may be speeded up by increasing the number of pushers being used, until either the load on the motor driving the belt becomes limiting or there is simply no more room on the drive belt to add more pushers.

Figure 2:
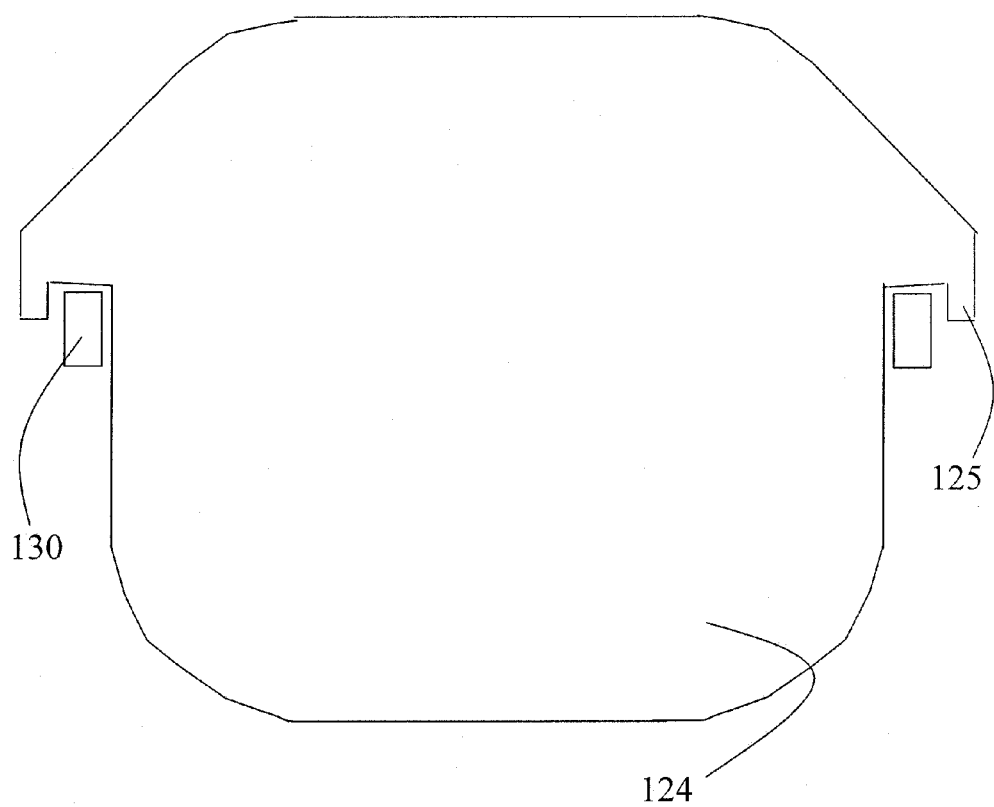
FIG. 2 is a plan view of a filter plate showing handles that engage in the receiving notch of the plate shifter, according to some embodiments of the present invention.

FIG. 2 shows a plan view of the filter plate 124 sitting on frame rails 130. The filter plate has handles 125 on either side that function to engage in the receiving notch of the plate pusher—see FIGS. 3 & 4.

Figure 3:
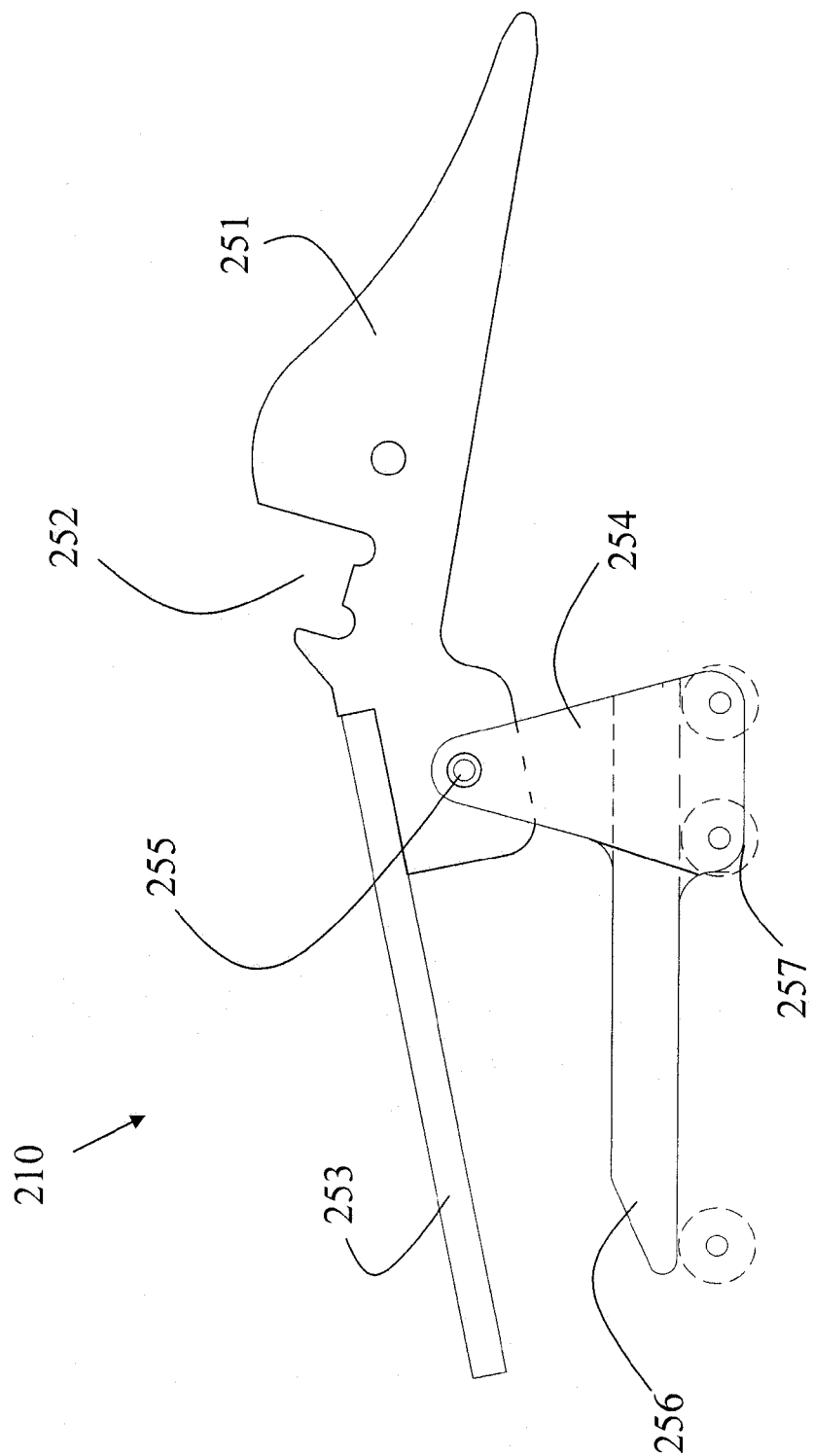
FIG. 3 is a side view of a first embodiment of a plate shifter structure, according to some embodiments of the present invention.
Figure 4:
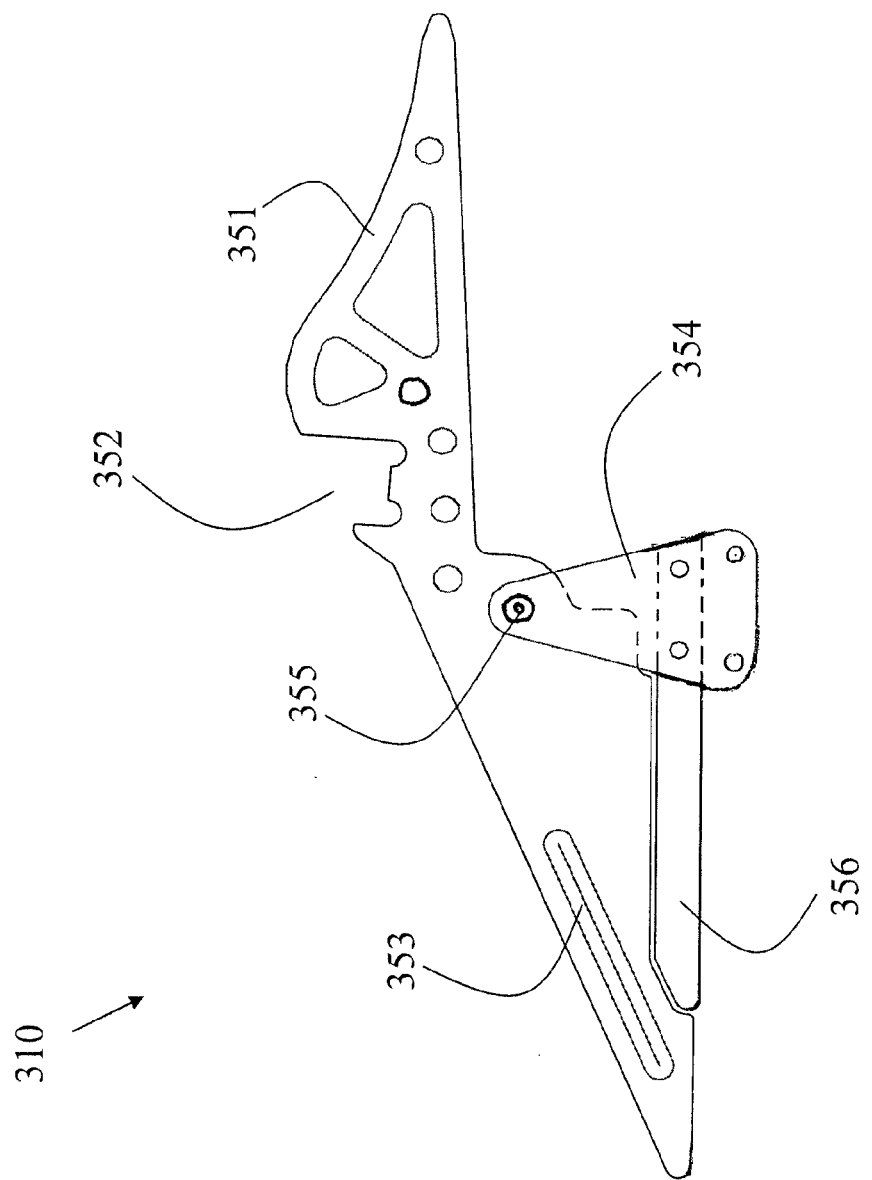
FIG. 4 is a side view of a second embodiment of a plate shifter structure, according to some embodiments of the present invention.

FIGS. 3 & 4 show embodiments of the pusher. In FIG. 3, the pusher 210 comprises: a pivoting structure 251, including a receiving notch 252 and counter balance 253; a pivot stand 254, including a pivot 255, a rear-facing stabilizer 256, which also acts as a stop for the counter balance 253; and hollow pins 257 which make up the drive belt/conveyor chain. The pivot stand 254 is attached to the conveyor chain by bolts through the hollow pins 257. In FIG. 4, the pusher 310 comprises: a pivoting structure 351, including a receiving notch 352 and embedded counter balance 353; a pivot stand 354, including a pivot 355, and a rear-facing stabilizer 356, which also functions as a back stop for the pivoting structure, the pivot stand including holes suitable for attaching the pivot stand to the drive belt/conveyor chain 114. As shown in FIGS. 3 & 4, the heads of the pivoting structures are configured with a profile including a tapered leading edge, followed on the upper side of the head by a rise and then the notch, where the rise is scaled with respect to the notch and the handle to disengage a handle from the notch when the rise is pushed below the bottom level of a handle of a plate in the stack, or of a handle of a dummy plate. The pivoting structures 251, 351 may be machined from cross-linked polyethylene. The pivot stands 254, 354 may be machined from an aluminum alloy. The pivots 255, 355 may include pressed-in bronze bushings set with a 5/16" machine bolt as a pivot. (In some embodiments, the pivot stands may comprise two triangular cheek blocks—providing support on either side for the machine bolt that acts as the pivot axle—and a hollow pipe for the rear-facing stabilizer.) The counter weight 253 is a 0.5" steel bar; however, an embedded steel counter weight 353 may be used, particularly in environments that include explosive/flammable liquids and gases. The counter weight may be embedded in a plastic or polymer material such as cross-linked polyethylene, for example. The counter weight is sufficiently heavy to ensure that the head of the pusher rises when the head is not constrained. The pushers 210, 310 are typically 1" thick, 12" long and 5" tall and the same size pushers are used for a wide range of filter plate sizes.

Figure 5:
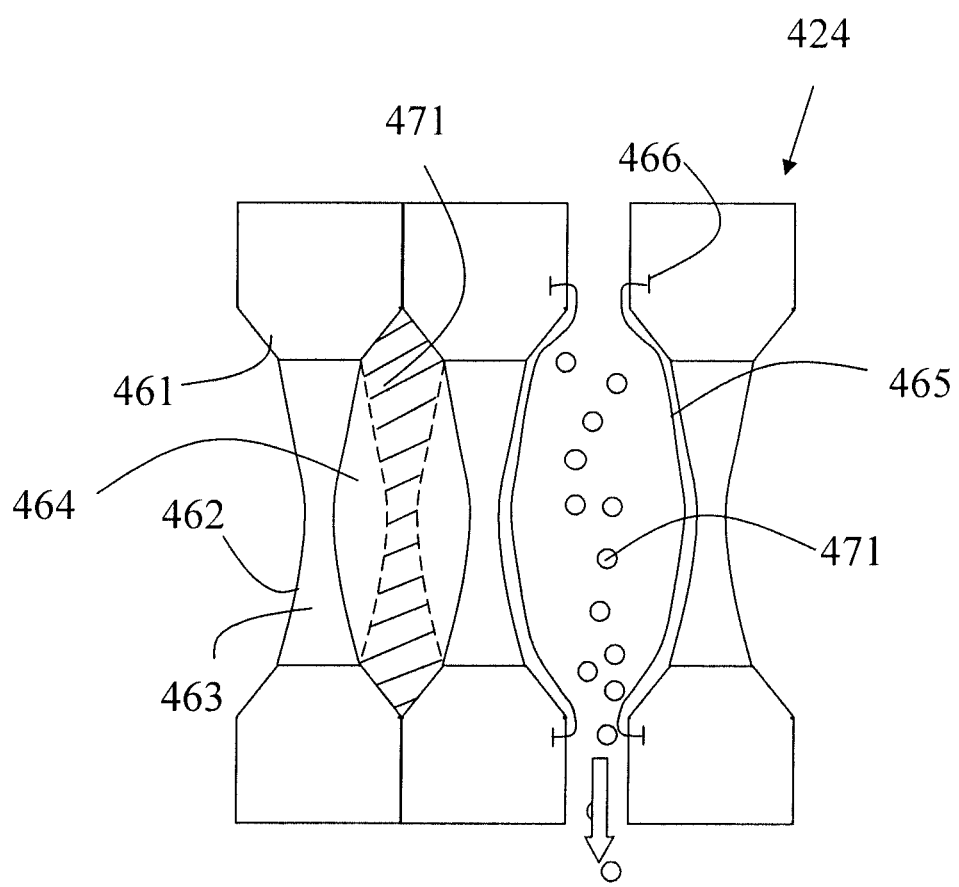
FIG. 5 is a representation of a process for separating filter plates in a filter plate stack in order to release filter cake from the chambers between plates, according to some embodiments of the present invention.

The schematic illustration of FIG. 5 shows a cross-sectional view of a block of three adjacent filter plates in the filter press during the process of separating plates to allow the dried filter cake 24 to fall out of the chambers, as shown, and to be collected. Each of the filter plates 424 is shown to comprise a frame 461 around the periphery of the plate, a diaphragm 462 in the center of the plate, the diaphragm containing a hollow envelope 463 which can be inflated or deflated in order to squeeze the filter cake 471 which sits in chambers 464 between the filter plates 424. Each of the chambers is lined with filter cloths 465, which are kept in position by retaining strips 466. Note that for ease of illustration filter cloths are only shown in one of the chambers. The filter plates are separated to allow the filter cake 471 to fall out of the chambers, as shown, and to be collected.

Although the present invention has been particularly described with reference to the preferred embodiments thereof, it should be readily apparent to those of ordinary skill in the art that changes and modifications in the form and details may be made without departing from the spirit and scope of the invention.

What is claimed is:

1. A filter press with a mechanical plate shifter mechanism, comprising:
    a filter press frame, said frame including a first frame rail and a second frame rail, said first frame rail being configured parallel to said second frame rail;
    a first stack of filter plates hanging on said first and second frame rails, each of the filter plates in said first stack having handles, said handles being a first handle adjacent to said first frame rail and a second handle adjacent to said second frame rail;
    a first plate pusher attached to a first drive belt, said first drive belt being attached to said filter press frame, said first drive belt being configured to move said first plate pusher parallel to said first frame rail in a first direction;
    a second plate pusher attached to a second drive belt, said second drive belt being attached to said filter press frame, said second drive belt being configured to move said second plate pusher parallel to said second frame rail in said first direction;
    wherein said first and second plate pushers are configured to simultaneously automatically mechanically engage with the first and second handles respectively of only a last filter plate in said first stack as said first and second plate pushers move in said first direction, said last filter plate being the last filter plate encountered by said first and second plate pushers as said first and second plate pushers move in said first direction along the length of said first stack and wherein said first and second plate pushers are configured to simultaneously automatically mechanically disengage from the first and second handles of said last filter plate on reaching one of a second stack of filter plates or an endplate while moving in said first direction; and
    wherein said first plate pusher and said second plate pusher each comprise:
        a head with a receiving notch configured to engage with one of said handles of said filter plates;
        a counter weight rigidly attached to said head, said counter weight being configured to keep said head raised in the absence of any handles coming into contact with said head, and wherein said counter weight is embedded in cross-linked polyethylene; and
        a pivot stand rigidly attached to said drive belt and attached to said head by a pivot joint, wherein said head is configured to rotate relative to said pivot stand in a vertical plane.

2. The filter press with a mechanical plate shifter mechanism as in claim 1, wherein said first plate pusher and said second plate pusher each further comprise a stabilizer rigidly attached to said pivot stand, said stabilizer being configured to act as a stop for said counter weight.

3. The filter press with a mechanical plate shifter mechanism as in claim 1, wherein said head is configured with a profile including a tapered leading edge, followed on an upper side of said head by a rise and then said receiving notch, and wherein said rise is scaled with respect to said receiving notch and said one of said handles to disengage said one of said handles from said notch when said rise is pushed below a bottom level of said one of said handles.

4. The filter press with a mechanical plate shifter mechanism as in claim 1, further comprising a multiplicity of additional first plate pushers and additional second plate pushers attached to corresponding ones of said first and second drive belts.

5. The filter press with a mechanical plate shifter mechanism as in claim 1, wherein said drive belt is a conveyer chain.

6. The filter press with a mechanical plate shifter mechanism as in claim 1, further comprising a dummy plate attached to said endplate, said dummy plate comprising thick handles, said thick handles being too thick to fit in said receiving notches.

7. A filter press with a mechanical plate shifter mechanism, comprising:
    a filter press frame, said frame including a first frame rail and a second frame rail, said first frame rail being configured parallel to said second frame rail;
    a first stack of filter plates hanging on said first and second frame rails, each of the filter plates in said first stack having handles, said handles being a first handle adjacent to said first frame rail and a second handle adjacent to said second frame rail;
    a first plate pusher attached to a first drive belt, said first drive belt being attached to said filter press frame, said first drive belt being configured to move said first plate pusher parallel to said first frame rail in a first direction;
    a second plate pusher attached to a second drive belt, said second drive belt being attached to said filter press frame, said second drive belt being configured to move said second plate pusher parallel to said second frame rail in said first direction;
    wherein said first and second plate pushers are configured to simultaneously automatically mechanically engage with the first and second handles respectively of only a last filter plate in said first stack as said first and second plate pushers move in said first direction, said last filter plate being the last filter plate encountered by said first and second plate pushers as said first and second plate pushers move in said first direction along the length of said first stack and wherein said first and second plate pushers are configured to simultaneously automatically mechanically disengage from the first and second handles of said last filter plate on reaching one of a second stack of filter plates or an endplate while moving in said first direction; and
    wherein said first plate pusher and said second plate pusher each comprise:
        a head with a receiving notch configured to engage with one of said handles of said filter plates, wherein said head is formed of machined cross-linked polyethylene;
        a counter weight rigidly attached to said head, said counter weight being configured to keep said head raised in the absence of any handles coming into contact with said head; and
        a pivot stand rigidly attached to said drive belt and attached to said head by a pivot joint, wherein said head is configured to rotate relative to said pivot stand in a vertical plane.

8. The filter press with a mechanical plate shifter mechanism as in claim 7, wherein said first plate pusher and said second plate pusher each further comprise a stabilizer rigidly attached to said pivot stand, said stabilizer being configured to act as a stop for said counter weight.

9. The filter press with a mechanical plate shifter mechanism as in claim 7, wherein said head is configured with a profile including a tapered leading edge, followed on an upper side of said head by a rise and then said receiving notch, and wherein said rise is scaled with respect to said receiving notch and said one of said handles to disengage said one of said handles from said notch when said rise is pushed below a bottom level of said one of said handles.

10. The filter press with a mechanical plate shifter mechanism as in claim 7, further comprising a multiplicity of additional first plate pushers and additional second plate pushers attached to corresponding ones of said first and second drive belts.

11. The filter press with a mechanical plate shifter mechanism as in claim 7, wherein said drive belt is a conveyer chain.

12. The filter press with a mechanical plate shifter mechanism as in claim 7, further comprising a dummy plate attached to said endplate, said dummy plate comprising thick handles, said thick handles being too thick to fit in said receiving notches.

13. The filter press with a mechanical plate shifter mechanism as in claim 7, wherein said counter weight is embedded in a polymer material.

14. The filter press with a mechanical plate shifter mechanism as in claim 13, wherein said polymer material is cross-linked polyethylene.

15. The filter press with a mechanical plate shifter mechanism as in claim 7, wherein said counter weight is embedded in a plastic material.

\* \* \* \* \*